United States Patent
Takao et al.

(10) Patent No.: US 8,192,624 B2
(45) Date of Patent: Jun. 5, 2012

(54) FILTERING APPARATUS

(75) Inventors: Dai Takao, Chuo-ku (JP); Motomi Ono, Chuo-ku (JP); Kotaro Neo, Chuo-ku (JP)

(73) Assignee: Tsukishima Kikai Co., Ltd., Tokyo (JP)

( * ) Notice: Subject to any disclaimer, the term of this patent is extended or adjusted under 35 U.S.C. 154(b) by 945 days.

(21) Appl. No.: 12/220,141

(22) Filed: Jul. 22, 2008

(65) Prior Publication Data
US 2009/0026125 A1 Jan. 29, 2009

(30) Foreign Application Priority Data

Jul. 23, 2007 (JP) ................... 2007-191423
Oct. 16, 2007 (JP) ................... 2007-268740
Oct. 16, 2007 (JP) ................... 2007-268762

(51) Int. Cl.
*B01D 33/06* (2006.01)
*B01D 33/00* (2006.01)
(52) U.S. Cl. ........ 210/338; 210/342; 210/332; 210/324; 210/329; 210/444; 210/315
(58) Field of Classification Search .................. None
See application file for complete search history.

(56) References Cited

U.S. PATENT DOCUMENTS
2005/0000885 A1* 1/2005 Stockbower .................. 210/435

FOREIGN PATENT DOCUMENTS

| EP | 1918008 | 5/2008 |
|---|---|---|
| JP | S62-279816 A | 12/1987 |
| JP | 2001-113109 | 4/2001 |
| JP | 2001-212697 | 8/2001 |
| JP | 2006-346600 | 12/2006 |
| JP | 2007-105585 | 4/2007 |
| JP | 2007-160246 | 6/2007 |

* cited by examiner

*Primary Examiner* — Nam Nguyen
*Assistant Examiner* — Madeline Gonzalez
(74) *Attorney, Agent, or Firm* — DLA Piper LLP (US)

(57) ABSTRACT

The invention relates to a filtering apparatus in which improvement of maintenance of a driving system, reduction of the number of components, and ease of assembly are achieved. In the filtering apparatus, cylindrical or conical inner and outer screens are concentrically disposed such that centers of the inner and outer screens are set along a vertical direction, at least one spiral fixed wall is provided in a filtering room between the inner screen and the outer screen, the inner screen and the outer screen are rotated around the centers thereof while the spiral fixed wall is not rotated, a treated liquid is delivered from a lower end side of the filtering room, a filtrate having passed through the inner screen and the outer screen is discharged to the outside, a cake formed by the filtering is elevated along the fixed wall and discharged to an upper side of the filtering room, the inner screen and the outer screen are coupled to each other below a lower end of the fixed wall, the inner screen and the outer screen are not coupled above the coupling position so as to be opened in a ring-like shape, and the inner screen and the outer screen are integrally rotated by a common driving power source.

5 Claims, 9 Drawing Sheets

FILTERING APPARATUS

DETAILED DESCRIPTION OF THE INVENTION

1. Field of the Invention

The present invention relates to a filtering apparatus.

2. Description of the Related Art

A metal screen filter, a mesh filter, a perforated plate filter, etc. are excellent in running performance, maintenance, and durability in comparison with a cloth (fiber) filter. A pressurized filtering apparatus such as a screw press and a rotary press which utilizes the metal screen filter, the mesh filter, the perforated plate filter, etc. has been put into practical use. The pressurized filtering apparatus has a long history and a very simple structure with the features such as low energy consumption, low noise and low cost, and obtains excellent dewatering performance even if when it is used for solid/liquid mixture which is difficult to be dewatered due to a low dry solid content. Therefore, the pressurized filtering apparatus is frequently used in the sewage sludge dewatering field (for example, see Japanese Patent Application Laid-Open (JP-A) Nos. 2001-212697 and 2001-113109).

As for the screw press including a cylindrical outer screen and a screw inserted in the outer screen, a treated liquid (feed) is continuously dewatered with a squeezing pressure generated by a clamping force of the screw while the treated liquid is transferred at a low speed from an entrance side toward an exit side. However, because the filtrate is squeezed only from the outer screen, a length of the outer screen is hardly shortened, and downsizing of a machine is hardly achieved.

As for the rotary press, on the other hand, it is necessary to enlarge a disc diameter or to provide plural rotary presses in order to improve throughput of dewatering filtration, which results in a problem of the enlarged machine or cost increase.

Therefore, the inventors have proposed a filtering apparatus including cylindrical or conical inner and outer screens which are concentrically disposed and a spiral fixed wall which is provided in a filtering room between the inner and outer screens, wherein a treated liquid is delivered from one end side of the filtering room, a cake is discharged from the other end side of the filtering room, and the filtrate is discharged to the outside through the inner and outer screens, the filtering apparatus being configured such that the inner screen and/or outer screen is rotated about a shaft while the spiral fixed wall is not rotated (for example, see JP-A Nos. 2006-346600 and 2007-160246).

However, it is sure that the filtering apparatus proposed by the inventors enables downsizing and an improved dewatering performance but there are still the following structural problems:

(i) Because the inner screen and the outer screen are separately formed, the number of components is increased to complicate assembly, and maintenance is troublesome.

(ii) Because driving systems of the inner screen and outer screen are independently formed, the number of components is increased to complicate the assembly, and the maintenance is troublesome.

(iii) Because the inner screen and the outer screen are separately formed and separately pivoted, concentricity between the inner screen and the outer screen is hardly managed.

(iv) Because the spiral fixed wall is supported by and fixed to both ends, it is necessary that a length of the fixed wall be accurately formed particularly in an axial direction, and that the axial length of the fixed wall be adjusted during the assembly.

SUMMARY OF THE INVENTION

The object of the present invention is to solve the above problems. In accordance with an aspect of the invention, a filtering apparatus includes cylindrical or conical inner and outer screens which are concentrically disposed such that centers of the inner and outer screens are set along a vertical direction; and at least one spiral fixed wall which is provided in a filtering room between the inner screen and the outer screen, the spiral fixed wall being extended in a direction along the center of the inner screen while revolving around the inner screen, wherein the inner screen and/or the outer screen is rotated around the center thereof while the spiral fixed wall is not rotated, a treated liquid (feed) is delivered from a lower end side of the filtering room, a filtrate having passed through the inner screen and the outer screens is discharged to an outside, a cake formed by the filtering is elevated along the fixed wall and discharged to an upper side of the filtering room, and the inner and outer screens are integrally coupled to each other.

In the filtering apparatus according to the aspect of the invention, the inner screen and the outer screen are integrally formed, and thus, advantageously the excellent maintenance, the reduction of the number of components, and the ease of assembly are achieved. Additionally, because the inner screen and the outer screen are integrally formed, it is not necessary to manage concentricity between the inner screen and the outer screen.

In the filtering apparatus according to the aspect of the invention, preferably the inner screen and the outer screen are integrally rotated by a common driving power source. In this case, the inner screen and the outer screen are integrally formed and further, the inner screen and the outer screen are driven by the common driving system. Such structure enables advantageously the excellent maintenance, the reduction of the number of components, and the ease of assembly.

In the filtering apparatus according to the aspect of the invention, also preferably the inner screen and the outer screen are suspended in an upper portion of the filtering apparatus. In this case, the inner screen and the outer screen are integrally formed and further, the inner screen and the outer screen are suspended in a cantilever manner in the upper portion of the filtering apparatus. Therefore, positions of the inner screen and outer screen can easily be adjusted during the assembly.

In the filtering apparatus according to the aspect of the invention, also preferably a casing is provided and the inner and outer screens are not supported by the casing, the casing encompassing surroundings and lower side of the inner and outer screens with a clearance for a filtrate discharge space. The adoption of such a structure enables that the casing is used only to form the filtrate discharge space, which facilitates the design for the apparatus. In the conventional apparatus, on the other hand, the inner screen and the outer screen are sandwiched between the upper surface and the bottom surface of the casing. Thus, a large load is applied to the casing and there are severe requirements for its specification.

In the filtering apparatus according to the aspect of the invention, also preferably a delivery pipe line of the treated liquid is extended along a radial direction after extended along the centers of the inner and outer screens from an outside of the casing to a lower end side of the inner and outer screens through a bottom portion of the casing, a front end of the delivery pipe line is opened to the filtering room through the inner screen, the delivery pipe line can be rotated according to rotations of the inner screen and the outer screen while an inside communication state is maintained in the delivery pipe line, an inside of the inner screen and an outside of the outer screen are both communicated with the filtrate discharge space, and a filtrate discharge port is provided in the bottom portion of the casing.

The adoption of the structure enables that filtrate discharged to the inside of the inner screen and filtrate discharged to the outside of the outer screen are collectively recovered through the common filtrate discharge space, resulting in the compact and simple filtrate discharge passage. In the conventional apparatus, on the other hand, the inner screen and the outer screen are sandwiched between the upper and bottom surfaces of the casing, and the inside of the inner screen and the outside of the outer screen are not communicated in order to ensure a sealing property of the filtering room between the inner screen and the outer screen. Therefore, it is necessary to separately recover the filtrate discharged to the inside of the inner screen and the filtrate discharged to the outside of the outer screen.

In the filtering apparatus according to the aspect of the invention, also preferably the fixed wall is suspended in an upper portion of the filtering apparatus. Thus, when the spiral fixed wall is fixed to and supported in the cantilever manner in the upper portion of the filtering apparatus, the fixed wall can correctly be attached only by adjusting a vertical position of the fixed wall during the assembly.

In the filtering apparatus according to the aspect of the invention, further preferably the inner screen and the outer screen are coupled to each other below a lower end of the fixed wall, the inner screen and the outer screen are not coupled above the coupling position so as to be opened in a ring-like shape and the fixed wall is fixed to and supported by the filtering apparatus through the ring-like opening in the upper portion of the filtering room.

The adoption of such a structure enables that the fixed wall is supported in the cantilever manner in the upper portion of the filtering apparatus simultaneously in its operation, a basic principle is followed in which the screen is rotated and the fixed wall is not rotated. Therefore, the fixed wall can be correctly attached only by adjusting the vertical position of the fixed wall during the assembly.

As can be seen from the above descriptions, the invention has the following advantages.

(1) The reduction of the number of components, the ease of assembly, and the excellent maintenance are achieved because the inner screen and the outer screen are integrally formed.

(2) Because the inner screen and the outer screen are integrally formed, it is not necessary to manage the concentricity between the inner screen and the outer screen.

DESCRIPTION OF THE PREFERRED EMBODIMENT

FIGS. 1 to 5 show a filtering apparatus according to an embodiment of the invention. The filtering apparatus includes a cylindrical inner screen 1, a cylindrical outer screen 2, and at least one spiral fixed wall 3. The inner screen 1 and the outer screen 2 are concentrically disposed such that centers of the inner and outer screens 1 and 2 are set along a vertical direction. The spiral fixed wall 3 is provided in a filtering room between the inner and outer screens 1 and 2, and is extended upward while revolving around the inner screen 1.

Figure 1:
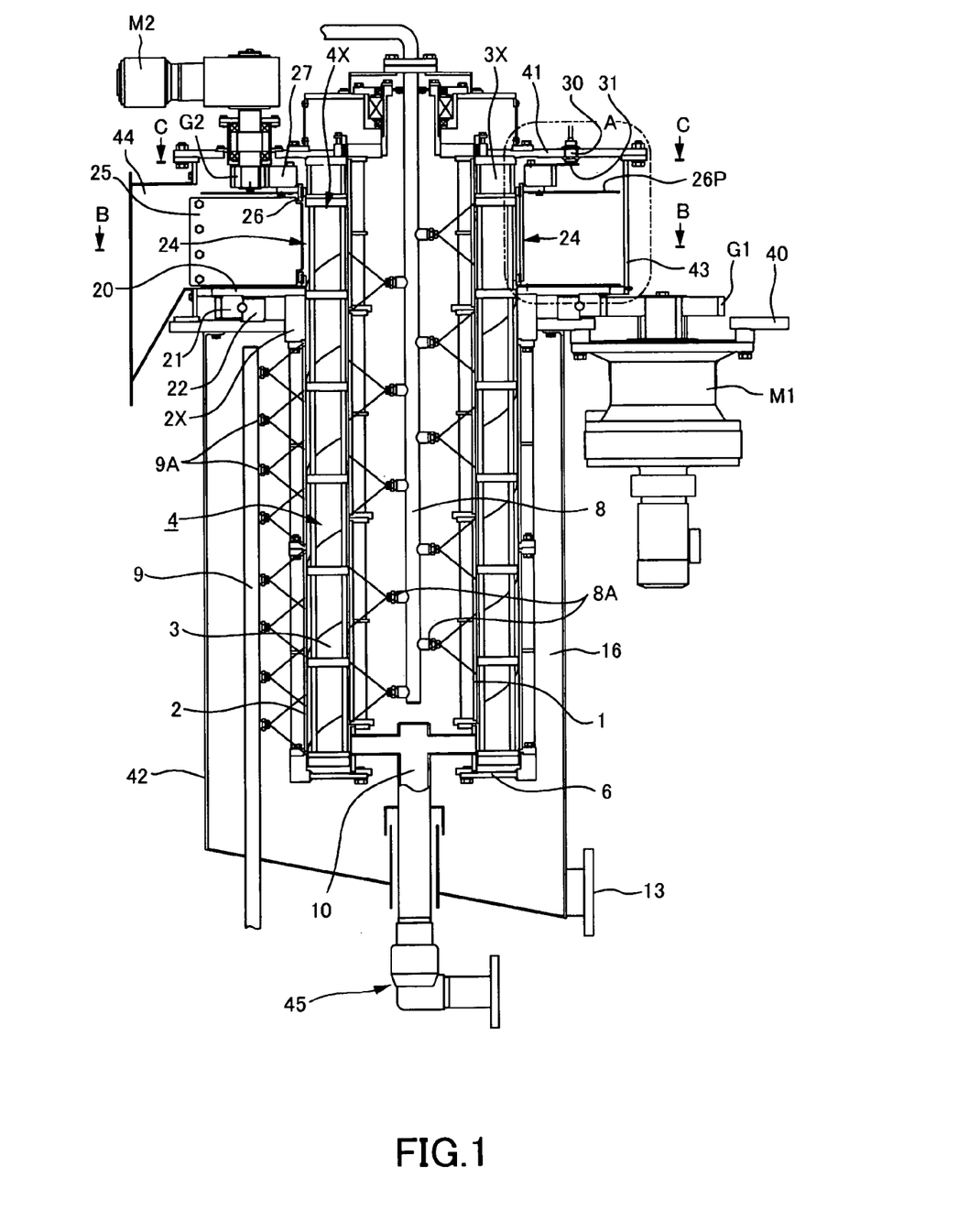
FIG. 1 is a longitudinal sectional view showing a filtering apparatus according to an embodiment of the invention.

A punching metal screen, a wedge wire screen, a metal mesh screen, and filter cloth can be used as the filters of the inner and outer screens 1 and 2. A wedge wire whose filter media has a high opening ratio may be disposed in a lower portion of a filtering room 4 where solid/liquid separation is mainly performed, and a punching metal having a large area of contact with the cake (low opening ratio) may be disposed in an upper portion of the filtering room 4 where squeezing dewatering is mainly performed.

Figure 5:
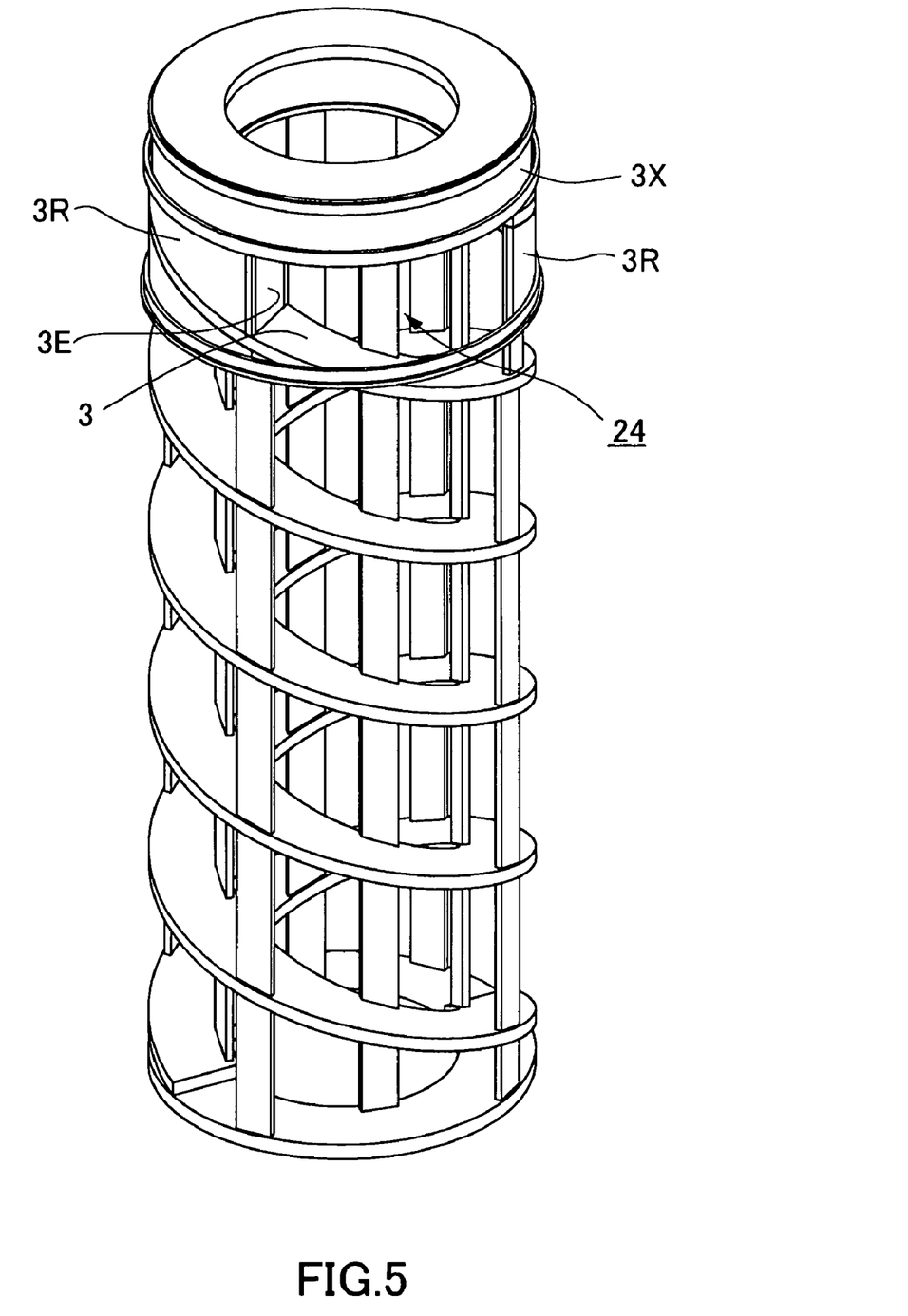
FIG. 5 is a perspective view showing a fixed wall.

As shown in FIGS. 1 and 5, the fixed wall 3 is formed into a spiral shape (helical shape or ribbon screw shape), in which the fixed wall 3 is extended upward while revolving around the inner screen 1. Many strips (two strips in the drawings) of fixed wall 3 are provided with a constant rotary angle difference in a circumferential direction in the cylindrical filtering room 4 formed between the inner and outer screens 1 and 2. An inner edge and an outer edge of the fixed wall 3 are brought close to or contact with the filter media of the inner and outer screens 1 and 2, respectively. When the fixed wall 3 is provided in the multi-strip spiral shape, advantageously a height of the discharge cake is constrained to decrease a necessary height for fixing a discharge duct, a total height of the apparatus can be suppressed to a lower level, and a conveying property of the discharge cake is improved in a conveyer. Obviously single-strip of fixed wall is possible as before.

Now, a more detailed description will be given. The embodiment of the inventive filtering apparatus includes a horizontal main support mounting 40 and a horizontal sub-support mounting 41. The sub-support mounting 41 is provided above the main support mounting 40 while separated from the main support mounting 40, and is supported by the main support mounting 40. The outer screen 2 is rotatably supported by the main support mounting 40. Specifically, a cylindrical support portion 2X is connected to an upper end of the outer screen 2, an inner circumferential edge portion of a ring-like rotating plate 20 concentric with the outer screen 2 is coupled to an upper surface of the support portion 2X, and a first ring-like pinion gear 21 concentric with the outer screen 2 is coupled to a lower surface of the ring-like rotating plate 20 at the outside with respect to the inner circumferential edge portion in a radial direction. The first ring-like pinion gear 21 is supported by a ring-like rail 22 which is provided on the main support mounting 40 while being concentric with the outer screen 2. Teeth in an outer circumferential surface of the first ring-like pinion gear 21 are engaged with a pinion gear G1 of a driving shaft of a first motor M1 mounted on the main support mounting 40.

Below the lower end of the fixed wall 3, a lower end portion of the inner screen 1 is integrally coupled to a lower end portion of the outer screen 2 through the means of a ring-like plate 6, which closes a lower opening of a space (filtering room) formed between the inner and outer screens 1 and 2. Therefore, not only the outer screen 2 but also the inner screen 1 coupled to the outer screen 2 are integrally rotated by driving the first motor M1. On the other hand, the inner and outer screens 1 and 2 are not coupled above the lower coupling position (the ring-like plate 6) so as to be opened in a ring-like shape. The fixed wall 3 is projected upward beyond the upper end of the outer screen 2 through the ring-like opening. A ring-like support portion 3X is connected to the upper end of the fixed wall 3, and an upper end of the support portion 3X is coupled to the sub-support mounting 41. With this configuration, the support portion 3X is supported in the upper portion of the apparatus while suspended by the sub-support mounting 41, and the lower end of the fixed wall 3 is located near the lower end of the filtering room 4. The inner screen 1 is also projected upward beyond the upper end of the outer screen 2, and the upper end of the inner screen 1 is rotatably pivoted by the sub-support mounting 41. Thus, the integration of the structure, the cantilever type support and the common drive enable excellent maintenance, reduction of the number of components and ease of assembly.

A lower casing 42 is supported in a suspended manner below the main support mounting 40 so as to encompass the surroundings and lower side of the inner and outer screens 1 and 2 while a clearance is provided for a filtrate discharge space 16. Because the lower casing 42 is used only to form the filtrate discharge space 16, a large load is not applied to the lower casing 42.

A filtrate discharge port 13 is provided in a bottom portion of the lower casing 42. A process-liquid delivery pipe line 10 is extended along the center of the inner and outer screens 1 and 2 from the outside of the lower casing 42 to the lower end portion of the inner and outer screens 1 and 2 through the bottom portion of the lower casing 42. Then, the delivery pipe line 10 is extended along a radial direction, and a front end of the delivery pipe line 10 is opened through the inner screen 1 to the filtering room 4 above the ring-like plate 6. In the delivery pipe line 10, a swivel joint 45 is provided outside the lower casing 42 so that the delivery pipe line 10 can be rotated according to the rotations of the inner and outer screens 1 and 2 while the inside communication state is maintained in the delivery pipe line 10. The pressure feed of a treated liquid is performed through the delivery pipe line 10 by a pump (not shown). Although the delivery pipe line 10 is provided in the inner screen 1, the inside of the inner screen 1 and the outside of the outer screen 2 are communicated with the common filtrate discharge space 16 because the inner screen 1 is opened at the lower end, thereby obtaining the compact and simple filtrate discharge passage.

A cylindrical discharge room 4X is provided above the filtering room 4 (above the outer screen 2). The discharge room 4X is continuously formed by directly extending upward the filtering room 4. An upper portion of the discharge room 4X is encompassed by a bottom surface of the support portion 3X for the fixed wall 3, and an inner circumference of the discharge room 4X is encompassed by an outer circumferential surface of the inner screen 1. Each fixed wall 3 is extended to the upper end of the discharge room 4X and in a range from the lower end to the upper end of each extended portion of the fixed wall 3, a terminal wall 3E is vertically provided from an upper surface of the lower end portion, in addition, an outer circumferential surface from the terminal wall 3E to the upper end is covered with a circumferential wall 3R formed in the same height as the terminal wall 3E. Each opening portion is formed between the circumferential walls 3R as an ejection hole 24 opened to the outer circumferential surface (side face) of the discharge room 4X. The number of opening portions is equal to the number of strips of the fixed walls 3. The terminal wall 3E has a function of receiving the cake elevated along the fixed wall 3 and of pushing out the cake to the ejection hole 24.

The outer circumference of the discharge room 4X is concentrically encompassed by a cylindrical opening adjusting member 26. The opening adjusting member 26 has opening portions 26X each formed at a position where the opening adjusting member 26 overlaps the ejection hole 24, and a ring-like top plate 26P is hung over the ring-like rotating plate 20. The opening adjusting member 26 can be rotated in the circumferential direction of the discharge room 4X, a second ring-like pinion gear 27 is coupled to an upper end face of the opening adjusting member 26, and teeth in an outer circumferential surface of the second ring-like pinion gear 27 are engaged with a pinion gear G2 of a driving shaft of a second motor M2 mounted on the sub-support mounting 41. When the drive of the second motor M2 is controlled to move the opening adjusting member 26, an area of a portion in which each ejection hole 24 and a corresponding non-opening portion other than the opening portions 26X overlap each other is changed to adjust each opening area (portion overlapping the opening portion 26X) of the ejection hole 24.

Plural non-contact sensors 30 such as proximity switches are provided at intervals in a moving direction of the opening adjusting member 26 in order to detect a position of the opening adjusting member 26. In the illustrated embodiment, one or more detection units (detection plates) 31 are provided in appropriate points above the ring-like top plate 26P of the opening adjusting member 26 while positions of the detection units 31 can be adjusted, and the non-contact sensors 30 are provided on moving loci of the detection units 31, which move according to the movement of the opening adjusting member 26. The position of the opening adjusting member 26 can be detected based on a correlation between the position of each detection unit 31, which can be detected by the corresponding non-contact sensor 30, and the position of the opening adjusting member 26 so that the opening area of the ejection hole 24 can be detected. The drive of the second motor M2 is controlled based on the detection result, which allows a back pressure to be controlled based on the opening area of the ejection hole 24.

The upper surface of the above ring-like rotating plate 20 is located between the lower end of the ejection hole 24 and the upper end of the outer screen 2, and the ring-like rotating plate 20 is provided so as to encompass the surrounding of the discharge room 4X when horizontally viewed. A discharge guide plate 25 is vertically provided above the ring-like rotating plate 20 so as to intersect from the inner circumferential edge to the outer circumferential edge of the ring-like rotating plate 20. A lower end of the discharge guide plate 25 is slightly separated from the upper surface of the ring-like rotating plate 20. An inside end (end portion located on the inner circumferential edge-side of the ring-like rotating plate 20) of the discharge guide plate 25 is brought into contact with the outer side edge of the terminal wall 3E in any one of the ejection holes 24. An outside end of the discharge guide plate 25 is projected toward the outside from the outer circumferential edge of the ring-like rotating plate 20 and coupled to the main support mounting 40. The discharge guide plate 25 intersects obliquely on the ring-like rotating plate 20 with respect to the radial direction of the ring-like rotating plate 20 so as to direct to a rear side in the rotating direction of the ring-like rotating plate 20 toward the outside end of the discharge guide plate 25.

Above the ring-like rotating plate 20, each pushing-out guide plate 29 is vertically provided so as to extend obliquely from a point between the ejection holes 24 in the rotating direction and so as to intersect from the inner circumferential edge of the ring-like rotating plate 20 to a middle point (for example, the center) between the inner circumferential edge and the outer circumferential edge of the ring-like rotating plate 20. A lower end of the pushing-out guide plate 29 is slightly separated from the upper surface of the ring-like rotating plate 20, and an inside end (end portion located on the inner circumferential edge-side of the ring-like rotating plate 20) of the pushing-out guide plate 29 is coupled to the outer circumferential surface of the opening adjusting member 26. The pushing-out guide plate 29 intersects obliquely on the ring-like rotating plate 20 with respect to the radial direction of the ring-like rotating plate 20 so as to direct to a rear side in the rotating direction of the ring-like rotating plate 20 toward the outside end of the discharge guide plate 25.

The outer circumferences of the ring-like rotating plate 20 and ring-like top plate 26P are encompassed by a cylindrical upper casing 43. A range, in the upper casing 43, from a circumferential position corresponding to the inside end of the discharge guide plate 25 to a circumferential position corresponding to the outside end is opened as a discharge chute 44. In the illustrated embodiment, an upper end of the upper casing 43 is coupled to the sub-support mounting 41, a lower end is coupled to the main support mounting 40, and the sub-support mounting 41 is supported by the main support mounting 40 while the upper casing 43 is interposed therebetween.

Figure 2:
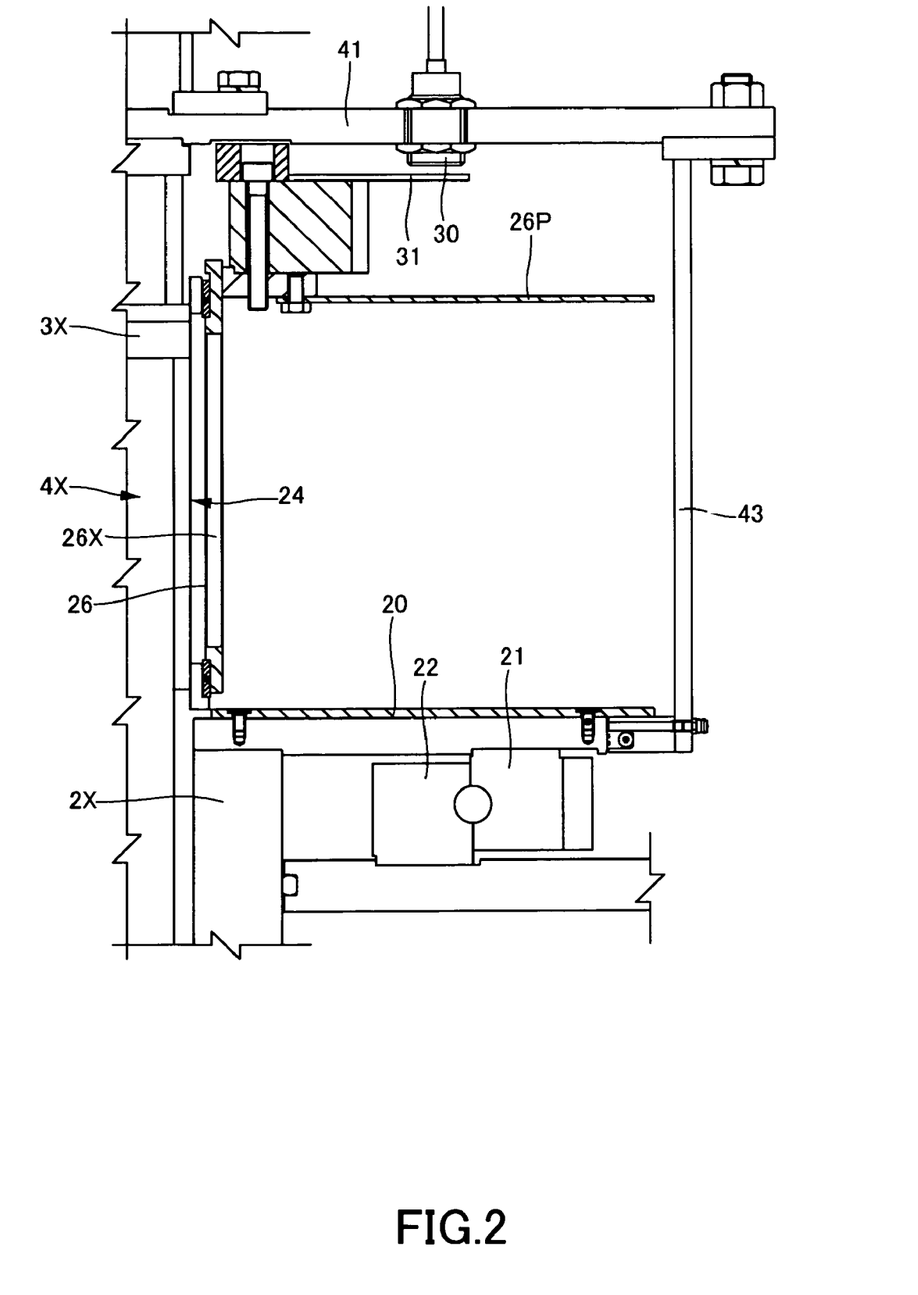
FIG. 2 is an enlarged view showing an A part of FIG. 1.
Figure 3:
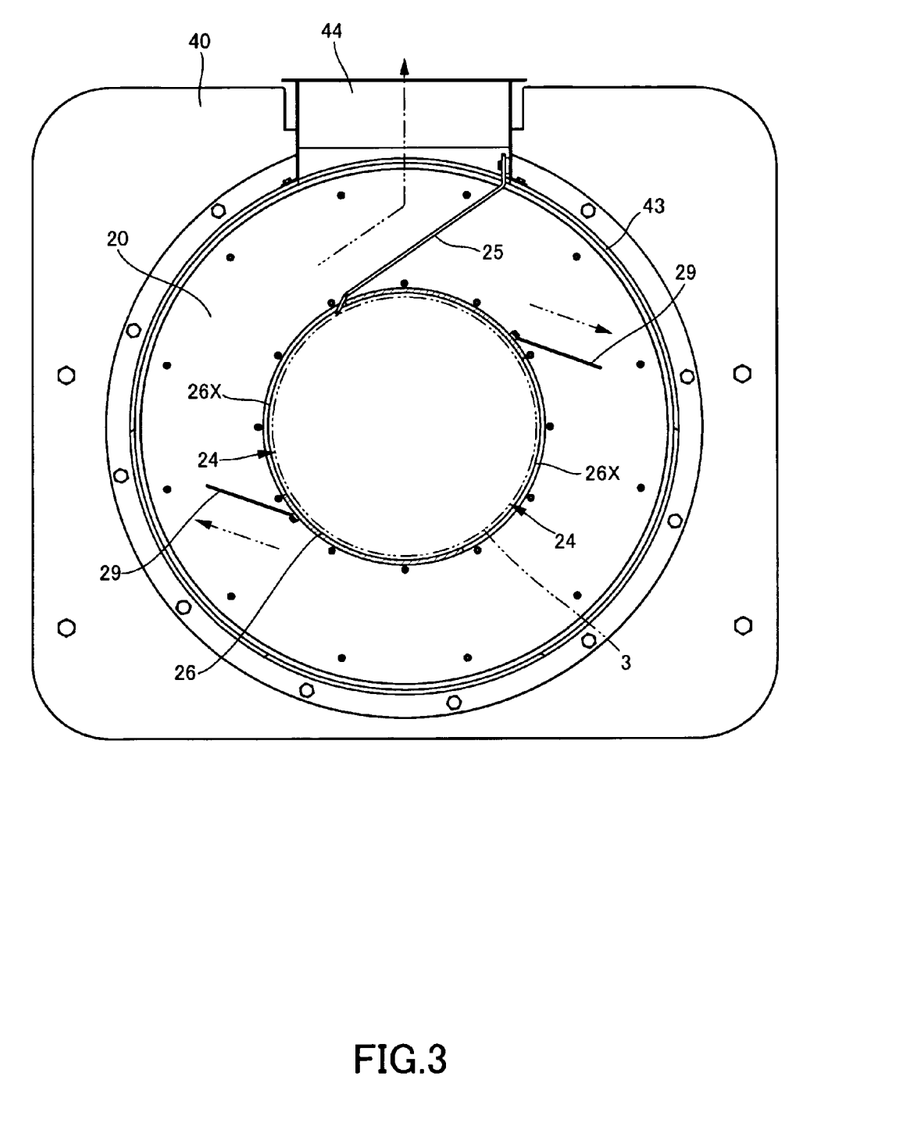
FIG. 3 is a sectional view taken along a line B-B of FIG. 1.
Figure 4:
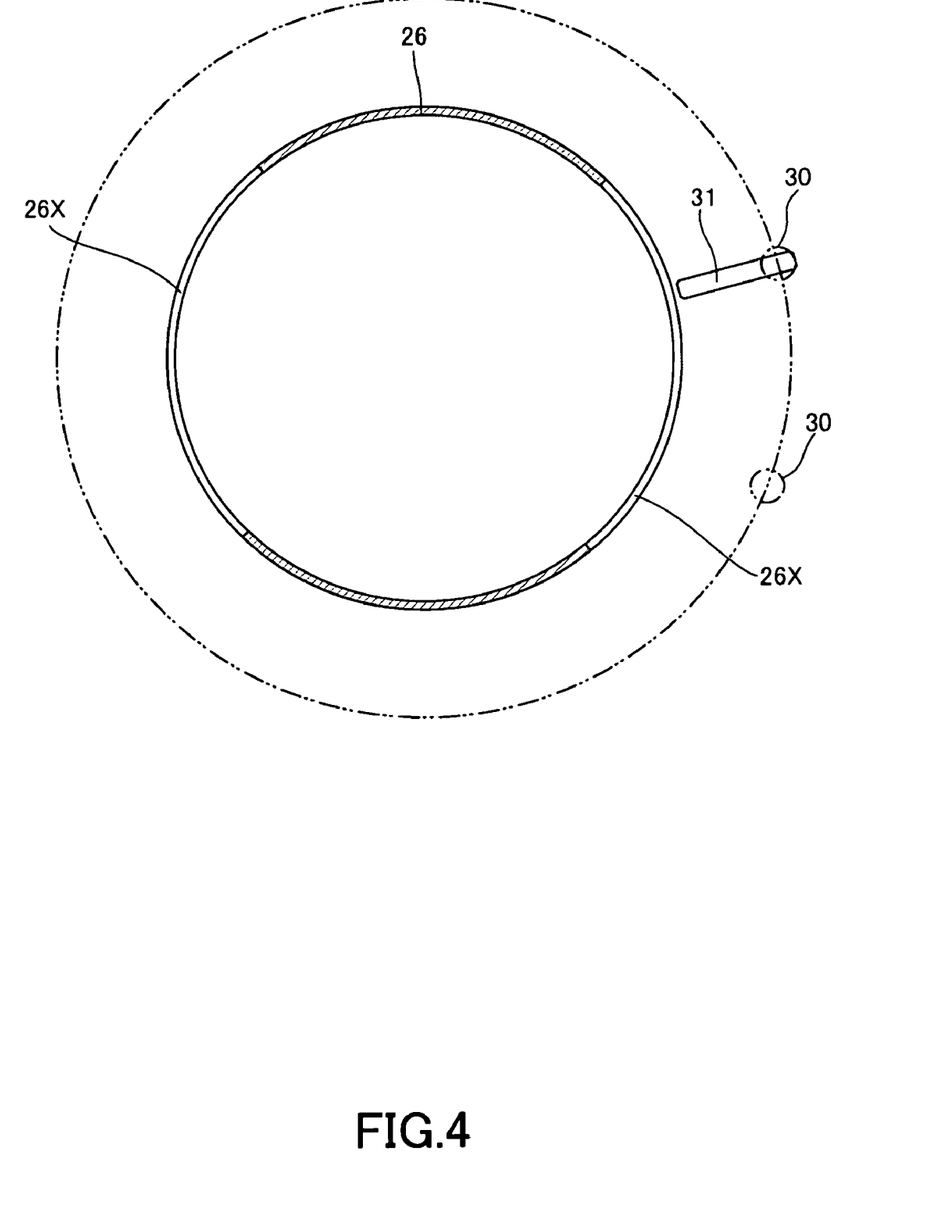
FIG. 4 is a sectional view taken along a line C-C of FIG. 1.

In the illustrated embodiment, an inner washing pipe 8 and an outer washing pipe 9 are provided to wash the inner and outer screens 1 and 2, respectively. As shown in FIGS. 1 and 2, the inner washing pipe 8 is provided along the inner circumferential surface of the inner screen 1, and plural washing nozzles 8A, 8A, . . . are attached to the inner washing pipe 8 so as to face the inner circumferential surface of the inner screen 1. Similarly the outer washing pipe 9 is provided along the outer circumferential surface of the outer screen 2, and plural washing nozzles 9A, 9A, . . . are attached to the outer washing pipe 9 so as to face the inner circumferential surface of the outer screen 2. Water or an alkaline chemical can be used as washing water.

The filtering apparatus having the above-described configuration can perform the following filtering operation. The first motor M1 is actuated to integrally rotate the inner screen 1, the outer screen 2, and the ring-like rotating plate 20 in the same direction as the elevating and revolving direction of the fixed wall 3, and the treated liquid is pressure-fed into the filtering room 4 through the process-liquid delivery pipe line 10.

The inner screen 1 and the outer screen 2 perform double filtering to the treated liquid delivered into the filtering room 4. More particularly, the treated liquid delivered from the process-liquid delivery pipe line 10 has a low dry solid content and high fluidity and subject to filtering and thickening through the apertures of the inner screen 1 and the outer screen 2 in the lower portion of the filtering room 4. With the progress of thickening, the fluidity of the treated liquid is decreased and a cake is formed. The cake is moved in the circumferential direction of the filtering room 4 by friction with the rotating inner and outer screens 1 and 2. At this point, because the spiral fixed walls 3 are disposed in the filtering room 4, the cake rotated around the inner and outer screens 1 and 2 interferes with the fixed walls 3, and a delivery pressure of the treated liquid is applied from below, the cake revolves and elevates around the shaft. In the lower portion of the filtering room 4, this movement causes solid/liquid separation, and thereby a cake is formed. In the upper portion of the filtering room 4, this cake is dewatered through squeezing. Then, the cake is pushed up from the upper portion of the filtering room 4 to the discharge room 4X.

On the other hand, the filtrate discharged to the inside of the inner screen 1 and the outside of the outer screen 2 by the filtering is accumulated in the bottom portion of the lower casing 42 and discharged through the filtrate discharge port 13.

The cake, which has been pushed up to the discharge room 4X along each fixed wall 3, is discharged onto the ring-like rotating plate 20 through each ejection hole 24. At this point, on the rear side in the rotating direction of each ejection hole 24, the cake, which has been located in the range from the inner circumferential edge on the ring-like rotating plate 20 to the middle point, is previously pushed out onto the outer circumferential edge-side by the pushing-out guide plate 29, thereby ensuring a space for the coming discharged cake at the discharge point of each ejection hole 24. Through a process in which the cake is rotated and transferred according to the rotation of the ring-like rotating plate 20, the cake mounted on the ring-like rotating plate 20 is pushed out to the outside discharge chute 44 by the common discharge guide plate 25 and is discharged to the outside of the apparatus so that the discharged cake is delivered to the next process through the conveyer.

During the washing, on the other hand, a high-pressure jet of the washing water is sprayed from the plural washing nozzles 8A, 8A, . . . , 9A, 9A, . . . while the inner and outer screens 1 and 2 are rotated about the shaft, thereby washing the clogged filter media of the inner and outer screens 1 and 2. The washing water is sprayed during the washing and is reserved as waste water of washing in the lower portion of the lower casing 42 along with the filtrate, and the washing water and the filtrate are discharged from the filtrate discharge port 13.

OTHER EMBODIMENTS (a) In the above embodiment, the inner edge and the outer edge of the fixed wall 3 are brought close to or into contact with the filter media of the inner and outer screens 1 and 2, respectively. However, because the solid/liquid separation action is clearly exerted mainly near the lower portion of the filtering room 4, that is, the delivery pipe line 10-side, it is necessary only to bring at least the delivery pipe line-side portions of the inner edge and the outer edge of the fixed wall 3 close to or into contact with the filter media of the inner and outer screens 1 and 2.

Figure 6:
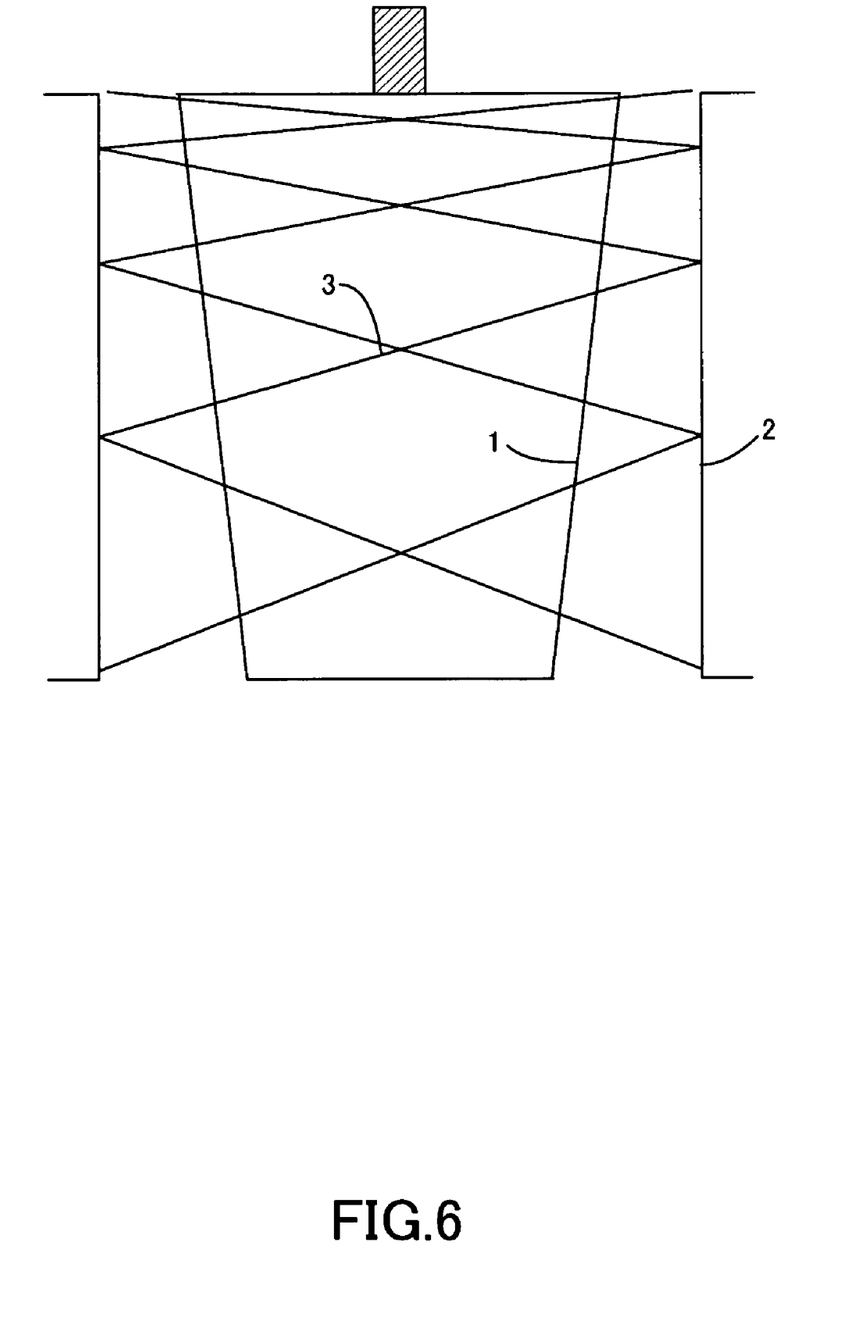
FIG. 6 is a longitudinal sectional view schematically showing another filtering apparatus.

(b) The whole of the fixed wall 3 can be formed at constant spiral pitch in the filtering room 4. Alternatively, as shown in FIG. 6, the pitch of the fixed wall 3 may gradually be narrowed toward the upper side if needed. On the contrary, the pitch of the fixed wall 3 may gradually be widened toward an upper plate from a bottom plate of the casing.

(c) The filtering room 4 of the embodiment is formed into the ring-like shape whose cross-sectional area is not changed in the vertical direction. Alternatively, a filtering room may be formed so as to have a large volume in the lower portion of the filtering room 4 in order to surely contain the throughput while a difference in radius between the inner and outer screens 1 and 2 is decreased in the upper portion of the filtering room 4 in order to improve the dewatering efficiency.

Figure 7:
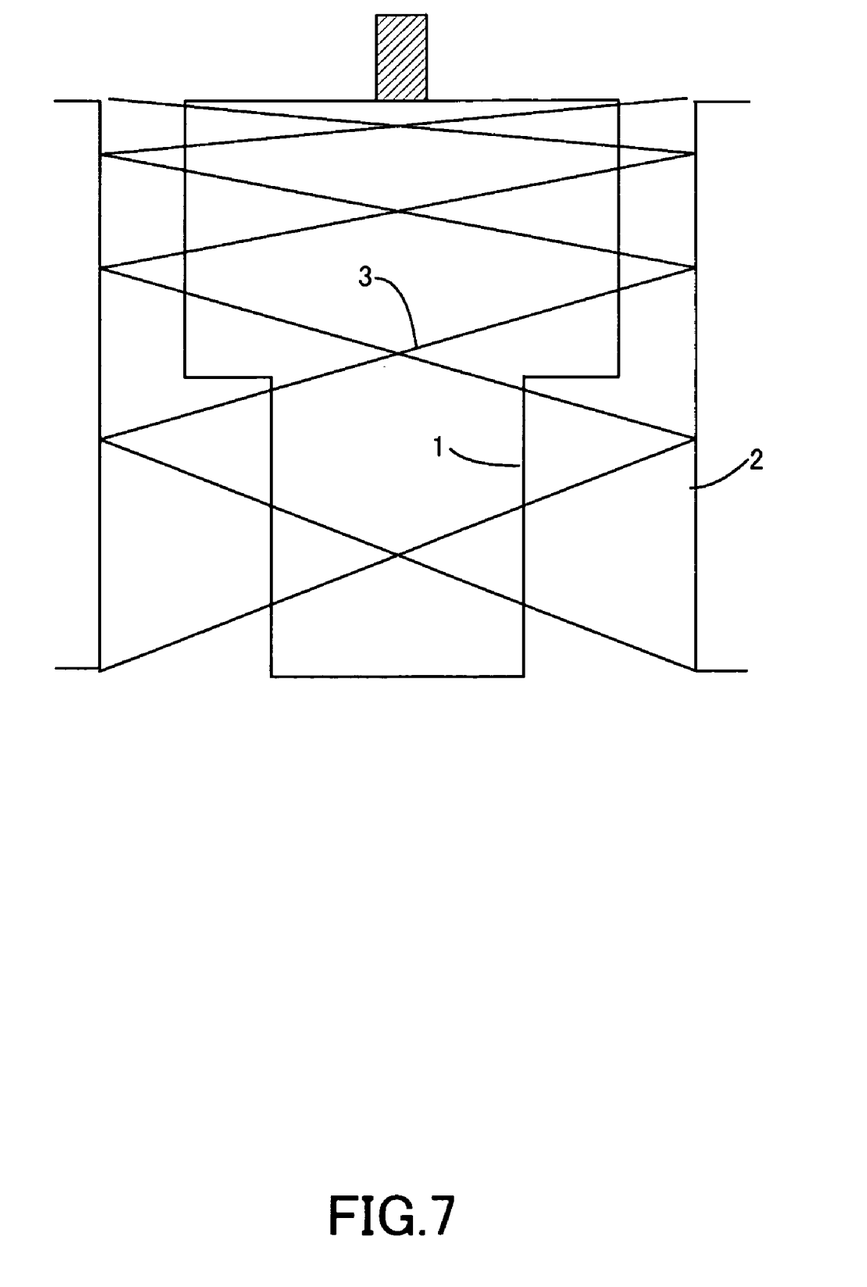
FIG. 7 is a longitudinal sectional view schematically showing another filtering apparatus.
Figure 8:
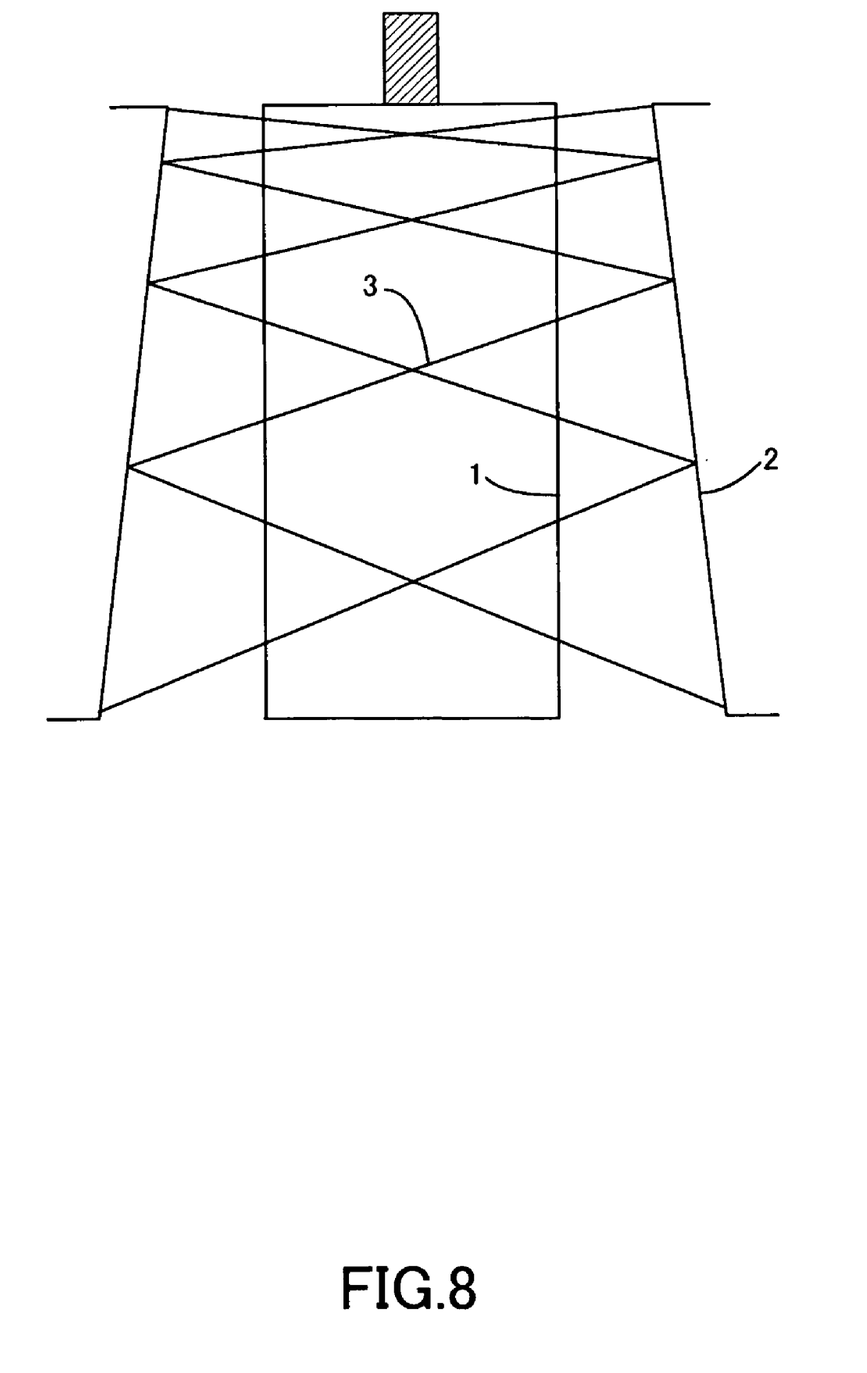
FIG. 8 is a longitudinal sectional view schematically showing another filtering apparatus.
Figure 9:
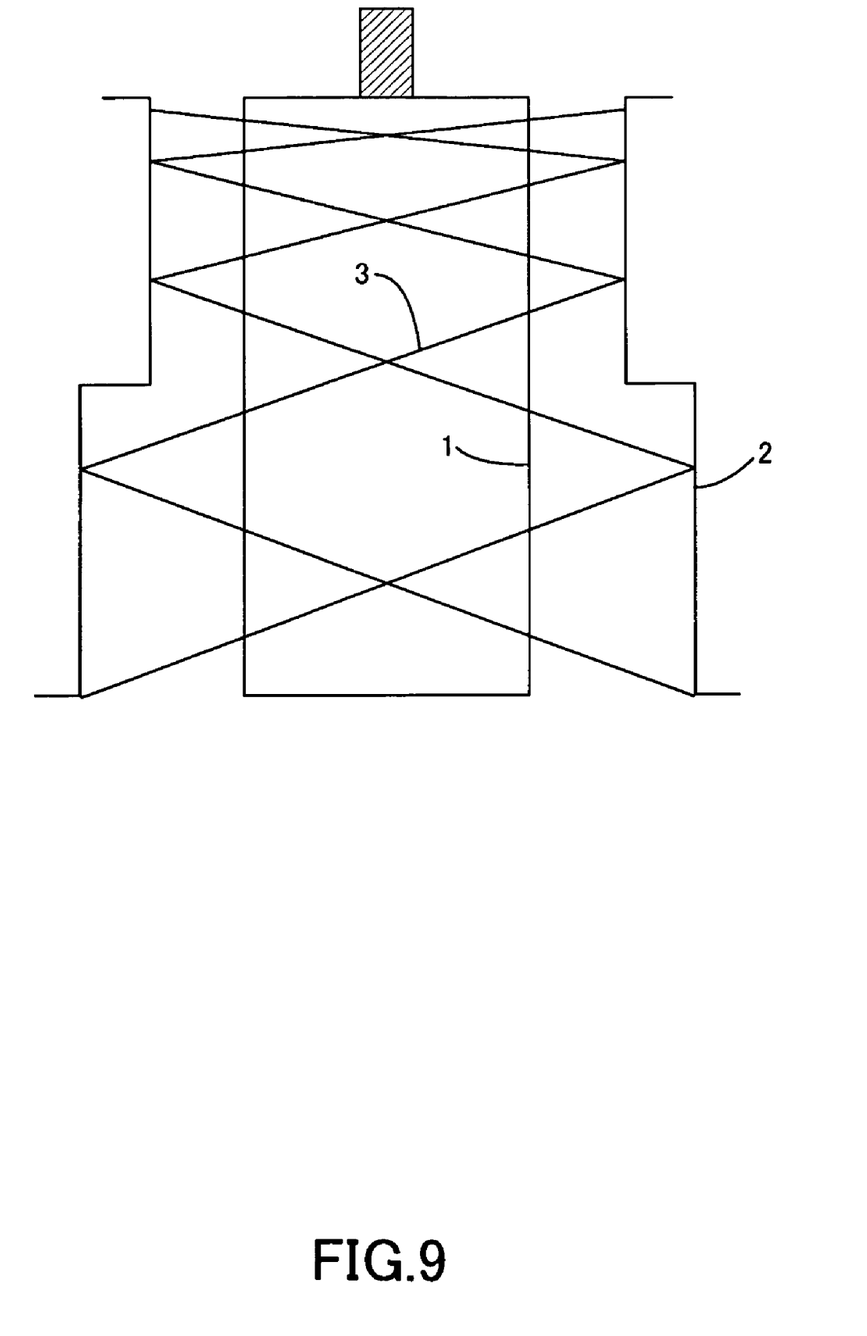
FIG. 9 is a longitudinal sectional view schematically showing another filtering apparatus.

Specifically it can be proposed that, while the shape of the outer screen 2 is not changed, the inner screen 1 may continuously be enlarged in the radial direction from the treated liquid delivery-side toward the cake discharge-side as shown in FIG. 6 (substantially conical shape), or the inner screen 1 may be enlarged in a stepwise manner as shown in FIG. 7 (multi-step cylindrical shape). Additionally it can be also proposed that, while the shape of the inner screen 1 is not changed, the outer screen 2 may continuously be reduced in the radial direction from the treated liquid delivery-side toward the cake discharge-side as shown in FIG. 8, or the outer screen 2 may be reduced in a stepwise manner as shown in FIG. 9.

(d) Even if the inner and outer screens 1 and 2 are rotated at the same angular speed (°/sec), a circumferential speed difference (mm/sec) is generated by the difference in radius between the inner and outer screens 1 and 2. Due to this circumferential speed difference, a shear force is generated in the cake thereby to improve the dewatering efficiency. For example, when a treated liquid containing raw sludge or mixed raw sludge having high fiber content is used, a shear force acts more effectively. Contrary to this, there is possibly a cake, which is, depending on a cake characteristic, sometimes fluidized by the application of a shear force, to thereby reduce a dewatering property. In such case, preferably the inner and outer screens 1 and 2 are rotated with a constant circumferential speed difference. Also, for a cake whose characteristic is not substantially changed throughout the year, even if dewatering efficiency is exerted by a shear force, the inner and outer screens 1 and 2 can be rotated with a constant circumferential speed difference.

(e) The inner and outer screens 1 and 2 can be coupled while they are not rotated each other. On the other hand, they can be coupled while they are rotated each other about the center. In such case, only one or both of the inner and outer screens 1 and 2 can be rotated. When both the inner and outer screens 1 and 2 are rotated, individual driving systems can be provided for the inner screen 1 and the outer screen 2 respectively.

(f) The inner and outer screens 1 and 2 can be supported in the cantilever manner in the lower portion of the filtering apparatus, or the inner and outer screens land 2 can be supported in the center impeller manner in both the upper and lower portions of the apparatus.

(g) Each fixed wall 3 of the above embodiment is fixed to and supported in the cantilever manner in the upper portion of the filtering apparatus through the ring-like opening in the upper portion of the filtering room 4. The support mode of the fixed wall 3 is not limited to this and can be appropriately determined according to the coupling position of the inner screen 1 and the outer screen 2. For example, in a case where the inner and outer screens 1 and 2 can integrally coupled only above the upper end of the fixed wall 3, the fixed wall 3 can be supported in the cantilever manner in the lower portion of the filtering apparatus through the ring-like opening in the lower portion of the filtering room 4.

What is claimed is:

1. A filtering apparatus comprising:
cylindrical inner and outer screens which are concentrically disposed such that centers of the inner and outer screens are set along a vertical direction; and
at least one spiral fixed wall which is provided in a filtering room between the inner screen and the outer screen, the spiral fixed wall being extended in a direction along the center of the inner screen while revolving around the inner screen,
wherein
the inner screen and the outer screen are rotated around the center thereof while the spiral fixed wall is not rotated,
a treated liquid is delivered from a lower end side of the filtering room, a filtrate having passed through the inner screen and the outer screen is discharged to an outside, a cake formed by the filtering is elevated along the fixed wall and discharged to an upper side of the filtering room, and
the inner screen and the outer screen are integrally coupled to each other; and
wherein
the inner screen and the outer screen are integrally coupled to each other below the lower end of the fixed wall, and the inner screen and the outer screen are not coupled above their coupled positions so as to be opened in a ring-like shape; and
the fixed wall is coupled to the upper portion of the filtering apparatus so as to be suspended therefrom through the ring-shaped opening which is above the filtering room.

2. The filtering apparatus according to claim 1, wherein the inner screen and the outer screen are integrally rotated by a common driving power source.

3. The filtering apparatus according to claim 1 or 2, wherein the inner screen and the outer screen are suspended in an upper portion of the filtering apparatus.

4. The filtering apparatus according to claim 3, wherein a casing is provided and the inner screen and the outer screen are not supported by the casing, the casing encompassing surroundings and lower side of the inner screen and the outer screen with a clearance for a filtrate discharge space.

5. The filtering apparatus according to claim 4, wherein
a delivery pipe line for the treated liquid is extended along a radial direction after extended along the centers of the inner and outer screens from an outside of the casing to a lower end side of the inner and outer screens through a bottom portion of the casing, a front end of the delivery pipe line is opened to the filtering room through the inner screen,
the delivery pipe line can be rotated according to rotations of the inner screen and the outer screen while an inside communication state is maintained in the delivery pipe line,
an inside of the inner screen and an outside of the outer screen are both communicated with the filtrate discharge space, and
a filtrate discharge port is provided in the bottom portion of the casing.

* * * * *